July 1, 1941.   K. HIPKE   2,247,812

SPOOL FOR CINEMATOGRAPH FILMS

Filed July 26, 1939

Kurt Hipke   Inventor

By His Attorneys

Patented July 1, 1941

2,247,812

UNITED STATES PATENT OFFICE 2,247,812

SPOOL FOR CINEMATOGRAPH FILMS

Kurt Hipke, Dessau, Germany, assignor, by mesne assignments, to General Aniline & Film Corporation, New York, N. Y., a corporation of Delaware Application July 26, 1939, Serial No. 286,553
In Germany July 30, 1938

5 Claims. (Cl. 242—70)

This invention relates to a spool for cinematograph films which can be mounted on different axles adapted for engagement at different heights and in differently shaped openings by coupling devices of different coupling cross-section. Such supporting and driving axles with coupling devices of different cross-section may, for example, be provided in apparatus in which films of different breadth are to be used. If it is desired to insert into this type of motion picture apparatus film spools of known kind which are provided with fixed coupling teeth for engagement with the coupling device of the driving axle intended for them, there can only be used spools the flange opening of which corresponds with the coupling teeth on the driving axle.

It is therefore an object of this invention to obviate the necessity of using in each motion picture apparatus only spools having the flange openings provided for that apparatus.

Further objects will become apparent from the detailed description following hereinafter.

By the invention there is provided in the core of the spool a bushing having jaws which can yield resiliently to permit the spool to be mounted on a coupling device intended for driving another spool. When the jaws have sprung back into position, they bear on the cylindrical driving axle and thus provide the spool with the necessary bearing on the axle. The bushing having the resiliently mounted jaws is capable of axial movement in the core of the spool.

Figure 1:
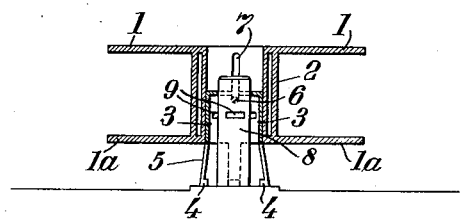
Figure 2:
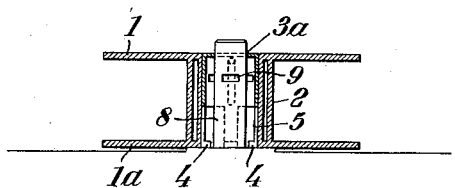
Figure 3:
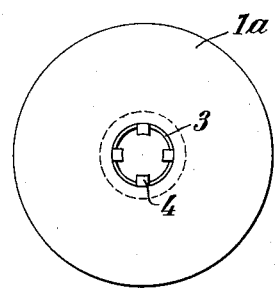

The invention is illustrated by way of example by the accompanying drawing, in which Figure 1 is an axial section of a spool according to the invention in a position before complete insertion of the axle in the bushing, Figure 2 is a like section after complete insertion of the axle in the bushing, Figure 3 is a plan view after complete insertion.

The spool, which comprises the flanges 1 and 1a and the core 2, has within the core a bushing 3 capable of axial motion and having jaws 4 which are mounted on the bushing 3 by resilient arms 5. A slot 7 in the core 2 parallel to the axis thereof engages a pin 6 of the bushing 3 so that the latter can move in axial direction in the core but cannot turn therein. When the bushing 3 is pushed partly out of the core 2 as shown in Figure 1, the resiliently mounted jaws 4 spring apart so that on placing the spool on the axle 8 the jaws do not come into contact with the coupling teeth 9.

In the example shown in the drawing, there are four of the resiliently mounted jaws 4 on the spool. Hence the spool could be mounted only on a spindle with corresponding projections, in the absence of the device of the present invention. However, since the present jaws are resiliently mounted as stated, these jaws spring outwardly when the bushing is extended from the core and permit the spool to be placed on axle 8, regardless of the number or spacing of the projections 9 on said axle. Three such projections are shown. When the spool is pushed further on the axle 8, the bushing is pressed into the core whereby the arms 5 are pressed together and the spool is guided on the axle in such a manner by the jaws 4, which now bear, as shown in Figure 2, on the axle, that the spool is freely rotatable thereon without substantial play. At the other end 3a, the opening in the bushing corresponds with the axle, so that the spool also has a proper bearing at this end. The spool may be held on said axle in any known manner. Since the invention is of special interest in connection with photographic cameras, the spool will usually be held in position by cooperating means on the camera body and/or cover.

If the axle is to drive the spool it must have on its lower end, between the jaws 4, one or more teeth which are engaged between the jaws.

I claim:

1. A spool comprising a core member, a bushing mounted in said core and having resiliently mounted bearing members at one end for engagement with a supporting axle, said bushing being axially slidable in said core between two positions, in one of which the bearing members are resiliently separable and in the other of which said members are held in their axle-engaging position.

2. A spool as in claim 1 wherein the core has an axial slot and the bushing has a pin engaged in said slot for limting the relative axial movement of said members and preventing relative rotary movement therebetween.

3. A spool comprising a core member, a bushing mounted in said core for axial movement between two positions, in one of which an end of said bushing extends axially beyond said core and in the other of which said bushing is retracted substantially within said core, said extendable end comprising resiliently mounted bearing members which spring apart when said bushing is extended and which are compressed to bearing position when said bushing is retracted with respect to said core.

4. A spool comprising a core member, a bushing mounted in said core for axial movement between two positions, in one of which an end of said bushing extends axially beyond said core and in the other of which said bushing is retracted substantially within said core, said extendable end consisting of resilient axial arms provided with inwardly turned jaws forming a bearing for engagement with a supporting axle, said jaws being sprung apart by said arms when said bushing is extended and being compressed to bearing position when said bushing is retracted with respect to said core.

5. A spool which can be mounted on different axles having differently spaced projections thereon, said spool comprising a core, a bushing mounted in said core for axial movement between two positions, in one of which an end of said bushing extends axially beyond said core and in the other of which said bushing is retracted substantially within said core, said extendable end consisting of four resilient axial arms provided with jaws forming a bearing for engagement with one of said axles, said jaws being sprung apart by said arms when said bushing is extended, for ready passage of said jaws over said projections as said spool is mounted on said axle, and said jaws being compressed to axle-engaging position when said spool is fully mounted and said bushing is retracted with respect to said core.

KURT HIPKE.